T. W. SAXTON.
MEANS FOR INDICATING DIRECTION APPLICABLE FOR USE WITH AIRCRAFT SUCH AS AEROPLANES.
APPLICATION FILED OCT. 29, 1919.

1,393,318.

Patented Oct. 11, 1921.
2 SHEETS—SHEET 1.

INVENTOR
Thomas William Saxton
By Lawrence Langner
Attorney.

T. W. SAXTON.
MEANS FOR INDICATING DIRECTION APPLICABLE FOR USE WITH AIRCRAFT SUCH AS AEROPLANES.
APPLICATION FILED OCT. 29, 1919.
1,393,318.
Patented Oct. 11, 1921.
2 SHEETS—SHEET 2.
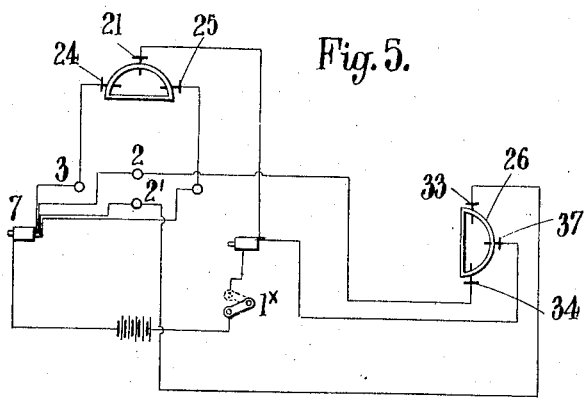
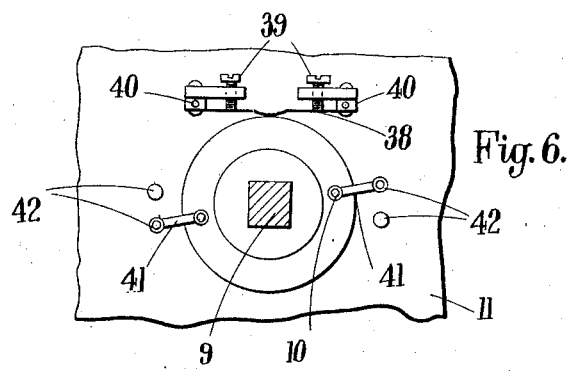
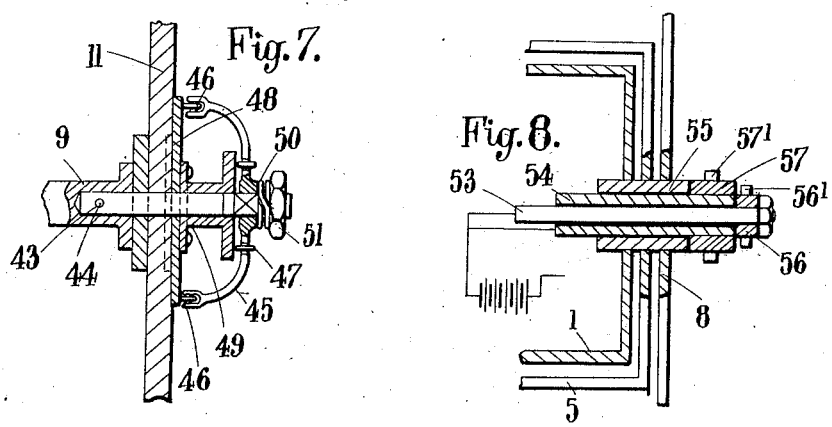
INVENTOR
Thomas William Saxton
By Lawrence Langner
Attorney.

UNITED STATES PATENT OFFICE.

THOMAS WILLIAM SAXTON, OF BARHAM, ENGLAND.

MEANS FOR INDICATING DIRECTION APPLICABLE FOR USE WITH AIRCRAFT SUCH AS AEROPLANES.

1,393,318.   Specification of Letters Patent.   Patented Oct. 11, 1921.

Application filed October 29, 1919. Serial No. 334,351.

*To all whom it may concern:*

Be it known that I, THOMAS WILLIAM SAXTON, a subject of the King of Great Britain, and resident of Barham, in the county of Kent, England, have invented certain new and useful Improved Means for Indicating Direction Applicable for Use with Aircraft Such as Aeroplanes, (for which I have filed application in Great Britain, No. 131,133, dated August 12, 1918,) of which the following is a specification.

This invention relates to means for indicating deviation or inclination and for maneuvering in cases where movements of an apparatus or machine such as an aeroplane need to be observed and in some cases checked or controlled. The means employed for this purpose are of the kind in which a poised or suspended body movable about two axes at right angles to one another serves by relative displacement during lateral and endwise and similar movements of the machine or other support on which it is mounted to establish electrical connections for bringing about the desired result as by the actuation of position restoring mechanism. In such apparatus means such as a scale and pointer have been provided to indicate the aforesaid relative displacement of the poised body, and the latter has contained a device such as a ball for completing the circuit of an external source of electrical energy.

The present invention has for its object improved apparatus of the kind above referred to, and it involves the provision of a poised or suspended body provided interiorly with a source of electric current and also furnished with illuminating means adapted for several and selective actuation according to the direction of deviation of the machine by contacts which are arranged exteriorly to the said body. These contacts are effective in closing electric circuits which include the illuminating means pertaining to the respective deviations, thereby severally and selectively indicating the direction of deviation of the machine; or the said contacts may be arranged in electric circuits adapted to automatically operate reversible motors for actuating the controls of the machine.

In order that the invention may be readily understood and carried into effect I will proceed to describe the same with reference to the accompanying drawings in which:

Fig. 5 is a diagrammatic view of the lamp connections and circuits.

Fig. 6 is a face view showing the bearing mounting on the instrument board.

Fig. 7 is a section illustrating a construction of bearing mounting.

Fig. 8 shows a horizontal section of a form of bearing or pivot for the frame.

Figure 2:
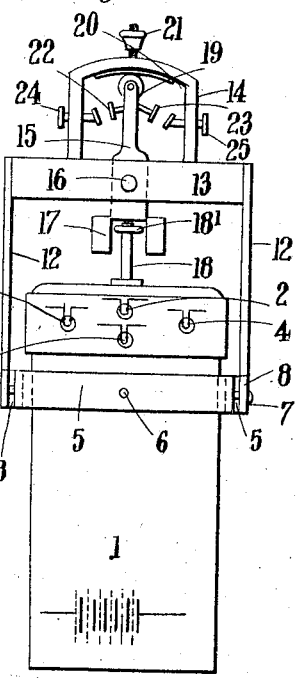
Fig. 2 is a front elevation thereof.

The poise 1 comprises a casing adapted to inclose an electric battery or accumulator of any appropriate type and which serves as the weight. The said casing is fitted with a series of electric lamps of which four are indicated at 2 $2^1$ 3 4 (see Fig. 2). The said poise is mounted in a gimbal frame 5 by means of the pivots or bearings 6 6, and the said frame 5 is similarly mounted by means of the pivots or bearings 7 7 in a carrying frame 8. This frame 8 is formed or provided with a rearwardly extending portion 9 whereby the device is secured in a suitable bearing 10 adapted for attachment to the surface of the instrument board 11, the bearing being capable of affording rotation to the device if desired, such for example as when the machine is used for stunting, looping the loop or otherwise maneuvering. A bracket or bridge piece 12 projects upwardly from the carrying frame 8 the transverse bar 13 of which supports a contact box or frame 14. A movable contact or tongue 15 is pivotally mounted at 16 in the bar 13 so as to be capable of vibratory action in the said box or frame. The said tongue 15 is loosely connected with the poise 1 by means of a winged guide 17 attached at the lower end of the tongue and an upstanding member or post 18 carried by the poise, the said post 18 being provided with an antifriction roller 18′ for facilitating its movement in the guide 17. The tongue 15 at the end remote from the loose connection is provided with a contact roller 19 which is adapted to make permanent electrical connection with the contact plate 20 which is electrically connected with the terminal 21 on the top of the contact box or frame 14. The said tongue is also provided with lateral contact points 22 23 which are adapted to make contact with the fixed contacts or terminals 24 25 in the sides of the box or frame 14.

The contacts just above described are operative as the result of the machine tilting sidewise as in "banking" and the consequent turning of the device about the pivots 6 6.

When the machine makes a dive in a downward or upward direction other contacts at the rear of the poise 1 are brought into operation. These contacts are housed in a box or frame 26 which traverses the portion 9 of the carrying frame 8. Projecting rearwardly of the gimbal frame 5 is a stem or finger 27 which enters an opening or guide 28 formed in a rocking member 29 pivoted at 30 in the rearwardly extending portion 9 of the carrying frame 8. The said member 29 carries upper and lower contact points 31 32 which are adapted to make contact with the fixed contacts or terminals 33 34 respectively, the latter contacts being mounted in the aforesaid box or frame 26. The member 29 is provided with a contact point 35 which makes permanent electric contact with the conducting plate 36, the latter in turn being in electrical connection with the terminal 37.

The main lead from the battery may be taken through a switch 1$^x$ mounted on the casing 1 to the pivots or bearings 7 of the carrying frame 8 and thence divided, one portion being taken to the terminal 21 and the other to the terminal 37. The several lamps are connected as follows: Lamp 2 is in the circuit established by the contact 32 with terminal 34 through contact 35 and terminal 37, the conductor to the lamp being connected at the terminal 34. Thus this lamp circuit is closed when the contact 32 engages the terminal point 34, current passing from the battery by way of the terminal 37, conducting plate 36, contact point 35, contact 32 and terminal 34; thence through the wire (not shown) to the lamp 2 and back to the battery. Similarly lamp 2$^1$ is operated when the contact point 31 is moved to engage the terminal point 33.

The lamps 3 and 4 are operated in like manner when the respective contact points 22 23 are engaged with their respective terminal points 24 25. The operation will however be readily understood without further detailed description.

It will be seen that when the machine tilts sidewise or "banks" the frame work pertaining to the poise will partake of such movement owing to the device being mounted on the instrument board. The tendency of the poise however will be to retain its position with the result that the tongue 15 will be deflected or turned about its pivot 16 so as to cause the one or the other of the contact points 22 23 to make contact with the one or the other of the contacts or terminals 24 25 according to the direction in which the machine is tilting or "banking". Thus the circuit pertaining to the one or the other of the lamps 3 4 as the case may be, is closed and an indication of the position of the machine given to the airman.

The indicating lamps are preferably adapted to show different colored lights.

If the machine, instead of tilting sidewise, makes a nose dive upward or downward, the rear set of contacts is brought into operation, the rocking member 29 owing to its loose connection with the gimbal frame 5 making contact with the one or the other of the contacts or terminals 33 34 according as the machine nose dives upwardly or downwardly. These terminals 33 34 are in electrical connection with the lamps 2 2$^1$ so that an indication is thereby given of the direction the machine is taking.

In addition to or in substitution for the visual indications the several contact making devices may be adapted to bring into operation reversible motors or the like whereby the machine controls may be actuated automatically. In the case of provision for alternative operation, a suitable switch would be located on the instrument board whereby the circuits pertaining to the one or the other mode of working may be cut out.

The bearing mounting 10 may as hereinbefore mentioned be such as to allow of the rotation of the apparatus, a suitable steadying or locking means such as a spring 38 being provided. The spring is adjusted or regulated by means of a screw or screws 39 and is carried by blocks 40 40 attached to the instrument board 11. The bearing mounting 10 may be adapted to serve as a switch for automatically cutting out the lamps or the controlling means by providing the same with radial arms 41 41 which upon the rotation of the mounting, engage with terminals 42 42 suitably connected with the lamp or other circuits. The construction of the bearing mounting may be as illustrated in Fig. 7 in which a central stud or pin 43 secured by means of a cross pin 44 or other suitable device in a recess in the rearwardly extending portion 9 projects through the instrument board 11 and carries (so as to rotate therewith) a spider 45 whereof the arms are furnished with anti-friction rollers or wheels 46 and the center or boss with similar rollers or wheels 47. The rollers 46 are adapted to bear against and run upon a race plate 48 and the rollers 47 similarly work upon the face of a distance or bearing piece 49 secured to the race plate 48. The parts may be adjusted by means of a spring washer 50 and nut 51.

Figure 1:
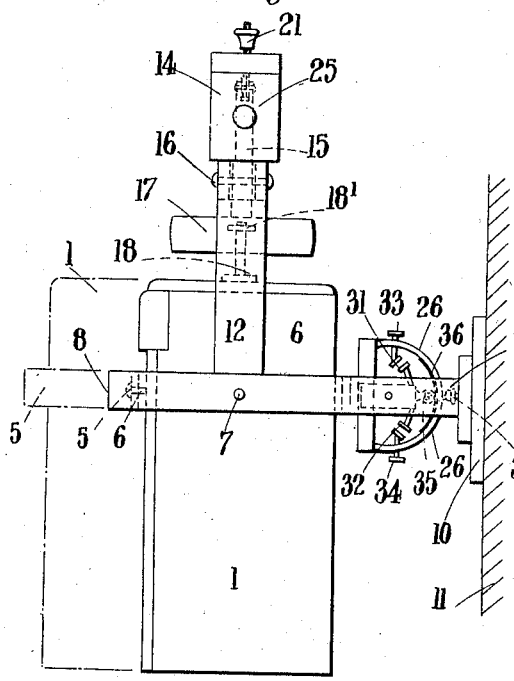
Figure 1 is a side elevation of an embodiment of the invention showing the same applied to the instrument board of an aeroplane.
Figure 3:
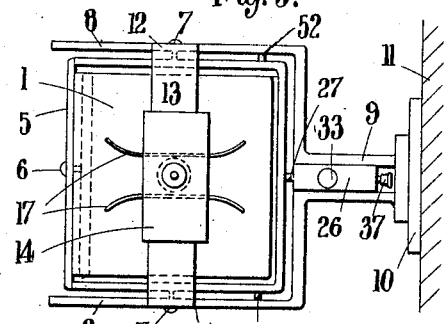
Fig. 3 is a plan corresponding with Fig. 1.
Figure 4:
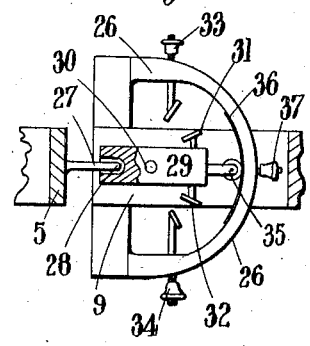
Fig. 4 is a detail view drawn to a larger scale illustrating the arrangement of the rear contact maker.

If under certain conditions of working such as stunting, looping the loop or the like, it is found necessary to move the pivots or bearings of the gimbal frame 5 in the frame 8 forwardly (as indicated in dotted lines in Fig. 1) the said frame 5 is provided with contacts 52 52 (Fig. 3) which are arranged to make contact with terminal contacts carried by a suitable fitting (not shown) on the frame 8, the said contacts being connected electrically with the respective lamps or indicating means. In order to allow of the various movements entailed by such maneuvering the pivot or bearing 7 may be arranged as shown in Fig. 8 in which a central pin 53 is passed through a bushing, which latter is in turn passed into another bushing 55. The pin and the bushings are insulated from each other by suitable material and the outwardly projecting ends of the pin 53 and bushing 54 are furnished with insulated conducting rings 56 and 57 respectively. These rings are formed or provided with lugs $56^1$ $57^1$ adapted to receive the conducting wires to the main lead terminals 21 and 37 and, owing to their attachment with the pivot or bearing, admit of the box or casing turning without causing winding or entanglement of the conducting wires. The inner end of the pivot or bearing is carried through slotted openings in the gimbal frame 5 and the side of the box or casing 1 so as to receive the leads from the battery or accumulator contained therein.

The box or casing 1 may be suitably divided into compartments for containing the battery or accumulator fuses, spare parts, lamps, etc., it being generally of advantage to maintain the working parts separate.

I claim—

1. In a device of the kind described, a controller, a post thereon, a pair of spaced contacts, a contact plate, a swinging contact maker movable between said contacts and provided with a contact in constant engagement with said plate, a pair of contacts on said contact maker and a guide on said contact maker engaging said post.

2. In a device of the kind described a controller, a post thereon, a pair of spaced contacts, a contact plate, a swinging contact member pivotally mounted intermediate its ends for movement between said contacts and provided with a contact in constant engagement with said plate, a pair of contacts on said contact member and a depending winged guide on the lower end of the contact maker engaging said post.

3. In a device of the kind described, a controller pivotally mounted on a framework, a contact box provided with a pair of contacts, a contact plate between said contacts, a swinging contact maker movable in said box between said contacts and provided at one end with a contact in engagement with said contact plate, a pair of contacts carried by the contact maker at opposite sides thereof for engagement with the contacts on said box, a guide on the other end of said contact maker and a post on said controller engaging said guide.

4. In a device of the kind described, a controller pivotally mounted on a framework, a pair of spaced contacts, a contact plate, a swinging contact maker movable between said contacts and provided with a contact in constant engagement with said plate, a pair of contacts on said contact maker, a guide at one end of said contact maker, and an operating member on said controller engaging said guide and adapted to actuate same in accordance with the movements of said controller.

Signed at London, England, in the county of London and State of Great Britain, this 9th day of October, A. D. 1919.

THOMAS WILLIAM SAXTON.